Dec. 20, 1955          G. H. KOCH          2,728,038

TWO-SPEED SINGLE-PHASE MOTOR

Filed July 21, 1953          2 Sheets—Sheet 1

WITNESSES:

John E. Hensley

Wm. C. Groome

INVENTOR
Gustav H. Koch.
BY
ATTORNEY

Dec. 20, 1955  G. H. KOCH  2,728,038
TWO-SPEED SINGLE-PHASE MOTOR
Filed July 21, 1953  2 Sheets-Sheet 2

INVENTOR
Gustav H. Koch.
BY
ATTORNEY

United States Patent Office 2,728,038
Patented Dec. 20, 1955

2,728,038

TWO-SPEED SINGLE-PHASE MOTOR

Gustav H. Koch, Springfield, Mass., assignor to Westinghouse Electric Corporation, East Pittsburgh, Pa., a corporation of Pennsylvania Application July 21, 1953, Serial No. 369,390

7 Claims. (Cl. 318—82)

The present invention relates to single-phase induction motors and, more particularly, to a two-speed, single-phase motor of the salient pole type.

Single-phase induction motors of the salient pole type, with shading coils for starting, are used extensively in the fractional horsepower sizes for driving fans, and similar applications. It is frequently desirable to be able to operate such motors at either of two speeds, and two methods of obtaining two-speed operation are in common use. In one of these methods, a main winding or coil is placed on each pole of the motor and an additional or auxiliary coil is also placed on each pole. For high-speed operation, the main coils are used alone, and for low speed the auxiliary coils are connected in series with the main coils to reduce the voltage per turn and thus reduce the torque, so that the motor runs at a lower speed.

This method of obtaining two-speed operation, however, has serious disadvantages. In most cases, the required size of the main coil is such that it occupies most of the available winding space, so that little room is available for the auxiliary coil. This usually makes it necessary to wind the auxiliary coil with smaller size wire, which substantially increases the cost when the coils are machine wound, since a second setup of the winding machine is necessary. The auxiliary coil also tends to retard the dissipation of heat from the main coil, resulting in higher temperatures in the main coil, and the cost of material and labor for the auxiliary coil add substantially to the cost of the motor.

When the space limitations are such that there is not room for an additional coil on the poles of the motor, two-speed operation has been obtained by means of an external reactor or resistor, which is connected in series with the motor for low-speed operation. This method of obtaining two-speed operation is more expensive than the method described above, because of the cost of the reactor or resistor, and it requires the provision of external mounting means for the reactor or resistor. The use of a reactor or resistor also involves increased losses, and frequently presents a problem of heat dissipation, because of the heat generated in the reactor or resistor. Thus, both of the arrangements which have been used to obtain two-speed operation of salient-pole, single-phase motors involve serious disadvantages.

The principal object of the present invention is to provide a two-speed, single-phase motor of the salient pole type which avoids the disadvantages of the arrangements previously used for this purpose and described above.

Another object of the invention is to provide a two-speed, single-phase motor of the salient pole type which requires no additional material or extra windings, as compared to a single-speed motor, and no external devices, and which can be produced at relatively low cost.

A further object of the invention is to provide a two-speed, single-phase motor winding which is adaptable to a twin motor arrangement, to provide simultaneous two-speed operation of two motors at relatively low cost.

Other objects and advantages of the invention will be apparent from the following detailed description, taken in connection with the accompanying drawings, in which.

Figure 1:
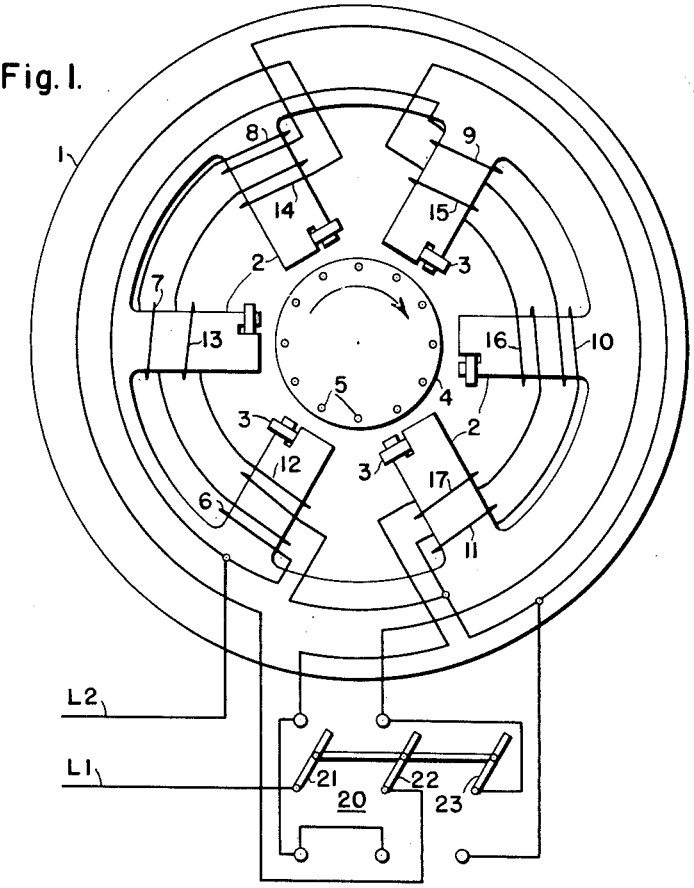
Figure 1 is a diagrammatic view of a two-speed motor embodying the invention.
Figure 2:
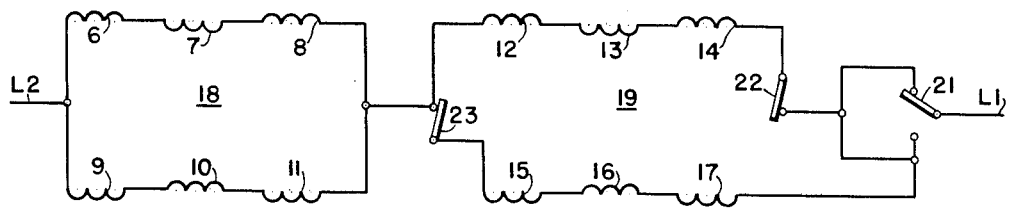
Figs. 2 and 3 are schematic wiring diagrams showing the connections of the winding for high-speed and for low-speed operation, respectively.
Figure 3:
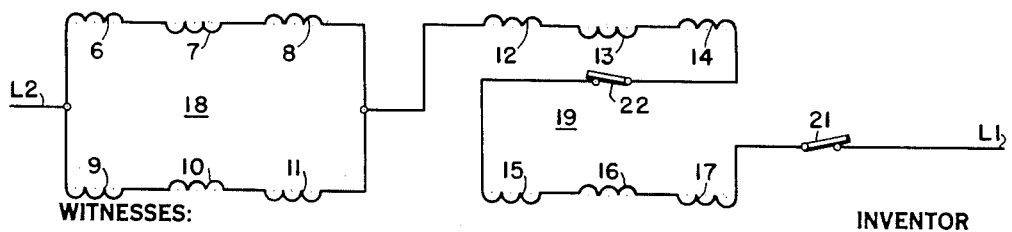

Figs. 1, 2 and 3 show an illustrative embodiment of the invention as applied to a six-pole motor, although it will be understood that the invention is applicable to motors having any number of poles. The motor may be of any suitable or usual construction and is shown diagrammatically as having a stator core 1, which may be of the usual laminated construction, and which is provided with salient pole pieces 2 which may be formed integrally with the core 1. The pole pieces 2 are preferably slotted to receive shading coils 3 to provide starting torque. The motor also has a rotor 4 of any suitable type provided with a squirrel-cage winding 5.

In accordance with the invention, the stator or primary winding of the motor consists of a concentrated winding on each pole divided into two parts or coils. The two coils on each pole may be wound as separate coils, or they may be wound as a single coil with a center tap to permit separate connections to the two parts. Each pole 2 is thus provided with a first coil, numbered 6 to 11, inclusive, on the drawing, and each pole is also provided with a second coil, numbered 12 to 17, inclusive. The coils are, of course, wound so that the poles alternate in polarity, as indicated diagrammatically on the drawings, and so that the two coils on each pole are of the same instantaneous polarity. The coils are designed so that the two coils of each pole together are electrically equivalent to the single coil which would be used in a conventional single-speed motor, and both coils are utilized for both speeds of operation of the motor.

One coil on each pole is permanently connected to the corresponding coil on each of the other poles to form a first winding group 18, as shown in Figs. 2 and 3. In the preferred arrangement illustrated in the drawings, the six coils of this winding group are connected in two parallel branches, with the coils 6, 7 and 8 connected together in series in one branch, and the coils 9, 10 and 11 connected in series in the other parallel branch.

The other coils on each pole are connected together in a second winding group 19, which is in series with the first winding group. The connections between the coils of the second winding group are changed to change the speed of operation of the motor, and any suitable switching means may be provided to effect the change in connections. For the purpose of illustration, a three-pole double-throw switch 20 is shown in the drawings having switch blades 21, 22 and 23 and connected to the winding as shown. It will be seen that, when the switch is in its lower position, the coils of the second winding group 19 are connected in two parallel branches, as shown in Fig. 2, with the coils 12, 13 and 14 in series in one branch, and the coils 15, 16 and 17 in series in the other branch. The two branches are connected together in parallel and in series with the first winding group 18 across the single-phase supply line L1, L2. This is the high-speed connection of the winding.

For low-speed operation, the switch 20 is moved to its upper position, which changes the connections of the winding group 19 and places all of the coils 12 to 17, inclusive, in series with each other and with the winding group 18, as shown in Fig. 3. It will be evident that the effect of this connection is to reduce the voltage per turn applied to the coils and, therefore, the flux density in the motor, so that the torque is reduced and the motor operates at a lower speed when driving a load such as a fan.

It will be apparent that two-speed operation is obtained in a relatively simple manner and at low cost, since the winding on each pole is equivalent to the coil which would be used in a conventional single-speed motor, so that is requires no added material or labor cost, and takes up no more space than a conventional single-speed coil. Thus, the disadvantages of the methods which have previously been used for obtaining two-speed operation are avoided and the cost is kept low. The particular connections of the winding shown are preferred, but other connections might be used within the scope of the invention. Thus, the coils 6 through 11 of the winding group 18 might be connected in series instead of in the parallel connection shown, but this is usually less desirable, because in most cases it would require a different size wire than would be used for the coils of the second group and would, therefore, increase the cost when machine winding is used.

The type of two-speed, single-phase winding described above is readily adaptable to a twin motor combination. Such arrangements are sometimes used for driving ventilating fans, and two-speed operation with simultaneous control of the two motors is frequently necessary.

Figure 4:
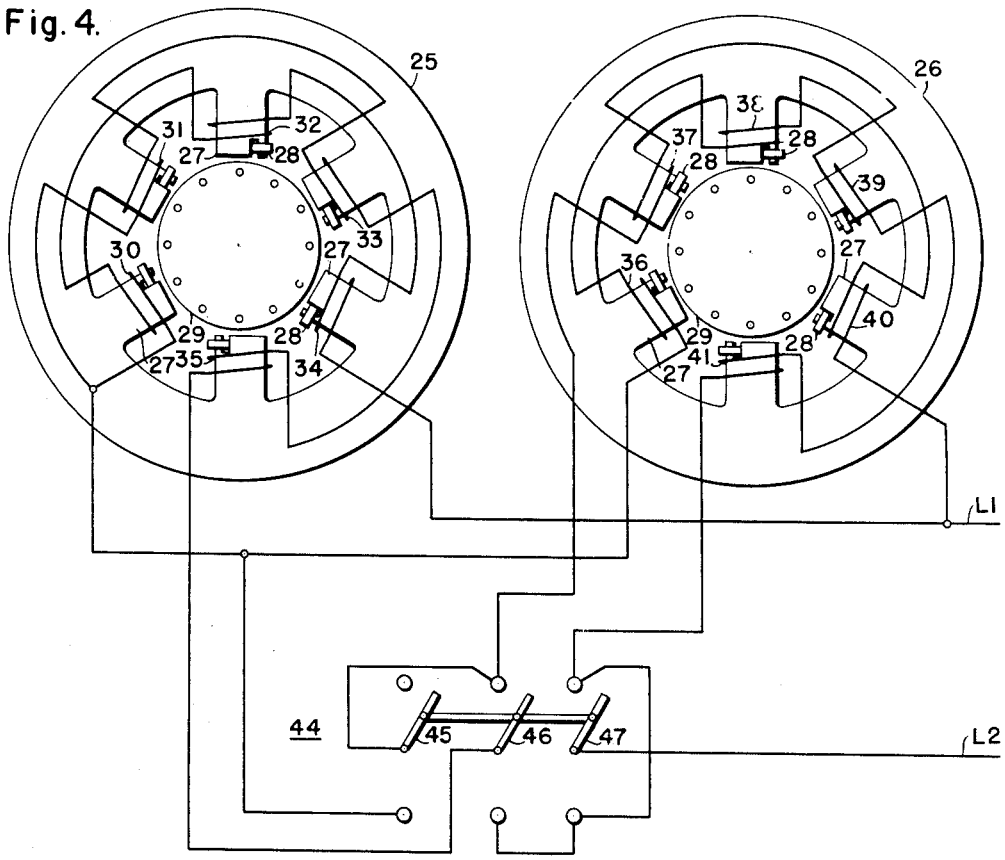
Fig. 4 is a diagrammatic view showing the application of the invention to a twin motor combination.
Figure 5:
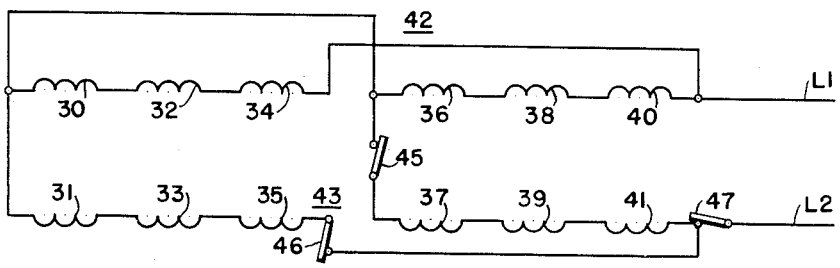
Figs. 5 and 6 are schematic wiring diagrams showing the winding of Fig. 4 connected for high-speed and for low-speed operation, respectively.
Figure 6:
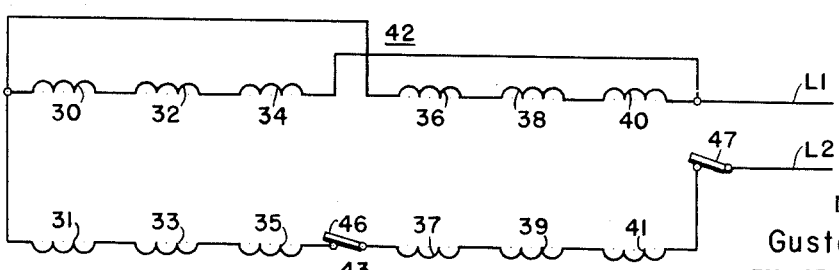

Figs. 4, 5 and 6 show the application of the winding described above to a twin motor combination. Fig. 4 shows diagrammatically two motors disposed side by side for simultaneous operation. The motors have twin stator cores 25 and 26, respectively, with salient pole pieces 27 and shading coils 28, and have squirrel-cage rotor members 29. The motors may be of any suitable construction and may be generally similar to the motor of Fig. 1.

Each pole of the two motors is wound with a single coil, which may be equivalent to the coil that would be used in a single-speed motor. Coils 30 to 35, inclusive, are placed on the poles 27 of one of the two motors, and coils 36 to 41, inclusive, are placed on the poles 27 of the other motor. Alternate coils of one motor are connected together and to alternate coils of the other motor to form one winding group 42, as shown in Figs. 5 and 6. Thus, in the embodiment shown, the coils 30, 32 and 34 are connected together in series and connected in parallel with the coils 36, 38 and 40 of the other motor, which are also connected in series. The odd-numbered coils of both motors are connected together in a second winding group 43 by means of a suitable external switching means 44. The switching means 44 may be of any suitable type and, for the purpose of illustration, it is shown disgrammatically as a three-pole, double-throw switch having switch blades 45, 46 and 47 connected to the winding as shown.

It will be seen from Fig. 4 that when the switch 44 is in its lower position, the coils of the winding group 43 are connected in two parallel branches. Thus, as illustrated in Fig. 5, the coils 31, 33 and 35 of one motor, which are permanently connected together in series, are connected in parallel with the coils 37, 39 and 41 of the other motor, which are also permanently connected together in series, and the winding group 43 thus formed is in series with the winding group 42 across the single-phase line L1, L2. This is the high-speed connection of the winding.

For low-speed operation, the switch 44 is moved to its upper position, and in this position the six coils which form the winding group 43 are all connected in series, and in series with the first winding group 42. In this connection, therefore, the motors operate at a low speed in the same manner as previously described in connection with Fig. 1. Thus, a twin motor combination is provided in which the two motors are simultaneously controlled for two-speed operation, and this result is obtained with only a single coil on each pole of each motor so that the cost is low. If desired, alternate coils might have different numbers of turns, but the same size wire can be used for all the coils, so that the cost of winding in an automatic winding machine is kept low.

It should now be apparent that a two-speed, single-phase motor winding has been provided which has many advantages over the previously used arrangements. In the new winding, the coils are connected in two winding groups, one of which remains permanently connected in the same manner at all times, while the second winding group is in series with the first group and is changed from a parallel to a series connection to obtain two-speed operation. In this way, no extra coils are required on the poles, so that a simple and low-cost arrangement is provided, and no external devices other than a simple switch are required. The winding has the further advantage of being readily adaptable to a twin motor combination to provide simultaneous control of two motors for two-speed operation in a simple and inexpensive manner.

Certain preferred embodiments of the invention have been shown and described for the purpose of illustration, but it will be apparent that various modifications and other embodiments are possible within the scope of the invention, and it is not restricted, therefore, to the specific arrangements shown.

I claim as my invention:

1. A two-speed, single-phase motor having relatively rotatable primary and secondary members, the primary member having a plurality of salient poles, shading coils on said poles, each pole of the primary member having two coils wound thereon, means for connecting together one coil of each pole in one winding group, means for connecting together the other coils of each pole in another winding group, said winding groups being connected in series, and means for alternatively connecting the coils of one group either in two parallel branches for operation at one speed or in series for operation at another speed.

2. A two-speed, single-phase motor having relatively rotatable primary and secondary members, the primary member having a plurality of salient poles, shading coils on said poles, each pole of the primary member having two coils wound thereon, means for connecting together one coil of each pole in one winding group, means for connecting together the other coils of each pole in another winding group, said winding groups being connected in series, and switching means for changing the connections of the coils of one group, said switching means being adapted to effect connection of the coils of said group in two parallel branches for operation at one speed and in series for operation at another speed.

3. A two-speed, single-phase motor having relatively rotatable primary and secondary members, the primary member having a plurality of salient poles, shading coils on said poles, a single primary winding comprising two coil groups connected in series, each of said groups including coils wound on each pole of the primary member and connected together, and means for changing the connections of one of said groups to connect the coils either in two parallel branches for operation at one speed or in series for operation at another speed.

4. A two-speed, single-phase motor having relatively rotatable primary and secondary members, the primary member having a plurality of salient poles, shading coils on said poles, a single primary winding comprising two coil groups connected in series, each of said groups including coils wound on each pole of the primary member and connected together, and switching means for changing the connections of the coils of one group, said switching means being adapted to effect connection of the coils of said group in two parallel branches for operation at one speed and in series for operation at another speed.

5. In combination, a pair of single-phase motors, each of said motors including a stator member having salient poles, a coil wound on each pole of both motors, means for connecting together certain of the coils of one motor and certain of the coils of the other motor in one coil group, means for connecting together the remaining coils of both motors in another coil group, said coil groups being connected in series, and means for alternatively connecting the coils of one group either in two parallel branches for operation of the motors at one speed or in series for operation at another speed.

6. In combination, a pair of single-phase motors, each of said motors including a stator member having salient poles, a coil wound on each pole of both motors, means for connecting together alternate coils of one motor and alternate coils of the other motor in one coil group, means for connecting together the remaining coils of both motors in another coil group, said coil groups being connected in series, and means for alternatively connecting the coils of one group either in two parallel branches for operation of the motors at one speed or in series for operation at another speed.

7. In combination, a pair of single-phase motors, each of said motors including a stator member having salient poles, a coil wound on each pole of both motors, means for connecting together alternate coils of one motor and alternate coils of the other motor in one coil group, means for connecting together the remaining coils of both motors in another coil group, said coil groups being connected in series, and switching means for changing the connections of the coils of one group, said switching means being adapted to effect connection of the coils of said group in two parallel branches for operation at one speed and in series for operation at another speed.

References Cited in the file of this patent
UNITED STATES PATENTS

| | | |
|---|---|---|
| 482,974 | Blathy | Sept. 20, 1892 |
| 1,780,881 | Kennedy | Nov. 4, 1930 |
| 2,310,874 | Schiff | Feb. 9, 1943 |
| 2,570,894 | Willsey | Oct. 9, 1951 |